(12) United States Patent
Lee et al.

(10) Patent No.: US 11,831,403 B2
(45) Date of Patent: Nov. 28, 2023

(54) NETWORK INTERFACE CARD STRUCTURE AND CLOCK SYNCHRONIZATION METHOD TO PRECISELY ACQUIRE HETEROGENEOUS PTP SYNCHRONIZATION INFORMATION FOR PTP SYNCHRONIZATION NETWORK EXTENSION

(71) Applicant: SYSMATE CO., LTD., Daejeon (KR)

(72) Inventors: Seungphil Lee, Daejeon (KR);
Yookyoung Lee, Sejong-si (KR);
Ganho Choi, Daejeon (KR); Sangman Lee, Daejeon (KR)

(73) Assignee: SYSMATE CO., LTD., Daejeon (KR)

( * ) Notice: Subject to any disclaimer, the term of this patent is extended or adjusted under 35 U.S.C. 154(b) by 36 days.

(21) Appl. No.: 17/567,591

(22) Filed: Jan. 3, 2022

(65) Prior Publication Data

US 2023/0163871 A1 May 25, 2023

(30) Foreign Application Priority Data

Nov. 23, 2021 (KR) .......................... 10-2021-0161953

(51) Int. Cl.
*H04J 3/06* (2006.01)
*H04L 49/00* (2022.01)

(52) U.S. Cl.
CPC .......... *H04J 3/0667* (2013.01); *H04J 3/0697* (2013.01); *H04L 49/70* (2013.01)

(58) Field of Classification Search
CPC ........ H04J 3/0667; H04J 3/0697; H04L 49/70
See application file for complete search history.

(56) References Cited

U.S. PATENT DOCUMENTS

| | | | |
|---|---|---|---|
| 10,608,842 B2 | 3/2020 | Shi et al. | |
| 2012/0275501 A1* | 11/2012 | Rotenstein | H04J 3/0667 375/220 |
| 2013/0163618 A1* | 6/2013 | Sergeev | H04J 3/0667 370/503 |
| 2016/0112182 A1* | 4/2016 | Karnes | H04L 7/0008 375/362 |
| 2016/0170439 A1* | 6/2016 | Aweya | H04L 69/28 713/401 |
| 2018/0176039 A1 | 6/2018 | Shi et al. | |

(Continued)

FOREIGN PATENT DOCUMENTS

| | | |
|---|---|---|
| KR | 10-2004-0080945 A | 9/2004 |
| KR | 10-0566984 B1 | 4/2006 |

(Continued)

*Primary Examiner* — Bailor C Hsu
(74) *Attorney, Agent, or Firm* — NSIP Law (57) ABSTRACT

Disclosed are a structure and a clock synchronization method of a precision network interface card for acquiring heterogeneous PTP synchronization information for PTP synchronization network extension. In order to precisely time-synchronize a synchronous switch at a remote location with a synchronous switch of an internal network, a precision time protocol (PTP) synchronous network system and a PTP synchronization method according to an embodiment allow a plurality of switches therebetween to operate as virtual nodes and can precisely measure Ingress_Time of a time synchronization message using a clock synchronized with the virtual nodes.

6 Claims, 4 Drawing Sheets

(56) References Cited

U.S. PATENT DOCUMENTS

| | | | |
|---|---|---|---|
| 2019/0116021 A1* | 4/2019 | Tanwar | H04J 3/0673 |
| 2020/0021379 A1* | 1/2020 | Aweya | H04J 3/0673 |
| 2020/0401434 A1* | 12/2020 | Thampi | H04J 3/0667 |
| 2021/0288738 A1* | 9/2021 | Byagowi | H05K 7/1491 |
| 2022/0337331 A1* | 10/2022 | Byagowi | H04L 69/28 |
| 2022/0345417 A1* | 10/2022 | Kasichainula | H04L 47/2441 |
| 2022/0400083 A1* | 12/2022 | Chandrasekaran | H04L 47/6225 |
| 2023/0024329 A1* | 1/2023 | Park | H04J 3/065 |

FOREIGN PATENT DOCUMENTS

| | | |
|---|---|---|
| KR | 10-2018-0034632 A | 4/2018 |
| KR | 10-2073200 B1 | 2/2020 |

\* cited by examiner

NETWORK INTERFACE CARD STRUCTURE AND CLOCK SYNCHRONIZATION METHOD TO PRECISELY ACQUIRE HETEROGENEOUS PTP SYNCHRONIZATION INFORMATION FOR PTP SYNCHRONIZATION NETWORK EXTENSION

CROSS-REFERENCE TO RELATED APPLICATION(S)

This application claims priority from Korean Patent Application No. 10-2021-0161953, filed on Nov. 23, 2021, in the Korean Intellectual Property Office, the disclosure of which is incorporated herein by reference in its entirety.

BACKGROUND

1. Field

The following description relates to a structure and method for a network interface card for time synchronization domain expansion in a network.

2. Description of Related Art

Multiple nodes through a network need time synchronization to increase work efficiency and accuracy between devices.

Today, ubiquitous computing, ultra-low latency networks, 5G-Mobile Edge Computing (MEC) computing, etc. are being performed under a distributed environment, and many applications recently require time synchronization.

Network Time Protocol (hereinafter referred to as "NTP") is a time synchronization technique that has been used in Internet environments for a long time but has a synchronization error of several milliseconds to several tens of milliseconds(s).

Precision Time Protocol (hereinafter referred to as "PTP") is a protocol for achieving microsecond-level precision time synchronization between nodes in a short-range network.

Much research on PTP synchronization has been conducted in Ethernet and wireless LAN environments, and methods for linking with wireless sensor networks, home networks, and ultra-low latency 5G networks are being developed. Many applications requiring ultra-low latency networks also employ the concept of time-precise synchronization. A precise starter between switches is very important to provide real-time services in smart factories, smart cars, and Internet of Things (IoT) networks using 5G networks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a PTP synchronization network interface card structure that, in order to implement precise time synchronization between a synchronous switch located remotely and a synchronous switch of an internal network, enables multiple switches therebetween to operate as virtual nodes, and an operation method thereof.

In one general aspect, there is provided a precision time protocol (PTP) synchronization method for extending an internal network via a heterogeneous PTP synchronization network operating as a virtual node, the PTP synchronization method using a PTP synchronization network system including a virtual node including a first switch at an ingress point and a second switch at an egress point, wherein the first switch and the second switch are time-synchronized with a second PTP master node; a first synchronous switch connected to the first switch, the first synchronous switch being a device synchronized with a first PTP master node; and a second synchronous switch connected to the second switch, the second synchronous switch being a device to be synchronized with the first PTP master node at a remote location, the PTP synchronization method including operations of: allowing the first synchronous switch synchronized with the first PTP master node to transmit a PTP message to the first switch; allowing the first switch to acquire ingress time of the PTP message using a clock synchronized with the second PTP master node and deliver the PTP message to the second switch in the virtual node; allowing the second switch to acquire egress time of the PTP message using the clock synchronized with the second PTP master node; allowing the second switch to calculate residence time using the ingress time and the egress time and then transmit the PTP message to the second synchronous switch; and allowing the second synchronous switch to acquire a time when the synchronization is made with the first PTP master node using the received PTP message.

The operation of allowing the first switch to acquire ingress time of the PTP message using a clock synchronized with the second PTP master node and deliver the PTP message to the second switch in the virtual node may include operations of: allowing the first switch to receive a sync message from the first synchronous switch; allowing the first switch to acquire an arrival time (Ingress_Time) of the sync message using the clock synchronized with the second PTP master node; and allowing the first switch to deliver the sync message toward the second synchronous switch.

The operation of allowing the first switch to acquire ingress time of the PTP message using a clock synchronized with the second PTP master node and deliver the PTP message to the second switch in the virtual node may further include operations of: allowing the first switch to receive follow_up message from the first synchronous switch; allowing the first switch to update propagation_delay in a correction field of the follow_up message received from the first synchronous switch; and allowing the first switch to add an arrival time of the sync message to a suffix field of the follow_up message and then successively deliver the follow_up message toward the second synchronous switch.

The operation of allowing the second switch to acquire egress time of the PTP message using the clock synchronized with the second PTP master node may include operations of: allowing the second switch to deliver the sync message to the second synchronous switch upon receiving the sync message; and allowing the second switch to acquire a departure time (egress_time) of the sync message.

The operation of allowing the second switch to calculate residence time using the ingress time and the egress time and then transmit the PTP message to the second synchronous switch may include operations of: checking the arrival time (Ingress_Time) of the previous sync message in the Suffix field of the successively received follow_up message; acquiring Residence_Time (Egress_Time−Ingress_Time) in the virtual node network using a clock synchronized with the second PTP master node; and reflecting Residence_Time (Egress_Time−Ingress_Time) in the correction field of the follow_up message and then transmitting the follow_up message to the second synchronous switch.

The first switch may include a network interface card (NIC) including a first port, a second port, a first phc clock, and a second phc clock; and the first phc clock may be synchronized with the second phc clock to acquire Ingress_Time of the PTP message of the first PTP master node received through the first port using the clock synchronized with the second PTP master node.

In another general aspect, there is provided a precision time protocol (PTP) synchronization network system including: a virtual node including a first switch at an ingress point and a second switch at an egress point, wherein the first switch and the second switch are time-synchronized with a second PTP master node; a first synchronous switch connected to the first switch, the first synchronous switch being a device synchronized with a first PTP master node; and a second synchronization switch connected to the second switch, the second synchronization switch being a device to be synchronized with the first PTP master node at a remote location, wherein the first synchronous switch synchronized with the first PTP master node transmits a PTP message to the first switch, the first switch acquires ingress time of the PTP message using a clock synchronized with the second PTP master node and delivers the PTP message to the second switch in the virtual node, the second switch acquires egress time of the PTP message using the clock synchronized with the second PTP master node, the second switch calculates residence time using the ingress time and the egress time and then transmits the PTP message to the second synchronous switch, and the second synchronous switch acquires a time when the synchronization is made with the first PTP master node using the received PTP message.

The first switch may include a virtual-node-supported precision network interface card (NIC) including a first port, a second port, a first phc clock, a second phc clock, and an Ingress_Timestamping structure; and the first phc clock may be synchronized with the second phc clock to acquire Ingress_Time of the PTP message of the first PTP master node received through the first port using the clock synchronized with the second PTP master node.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Advantages and features of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout.

In the following description, when the detailed description of the relevant known functions or configurations is determined to unnecessarily obscure the gist of the present invention, the detailed description will be omitted. Also, terms used herein are defined in consideration of functions used in the present invention and may be changed depending on a user, the intent of an operator, or a custom. Therefore, the definition should be made based on the contents throughout this specification.

Hereinafter, the example embodiments of the present invention will be described in detail with reference to the accompanying drawings. However, the following embodiments of the present invention may be modified in various other forms, and the scope of the present invention is not limited to the embodiment described in detail below. Embodiments of the present invention are provided for those skilled in the art to completely understand the present invention.

Figure 1:
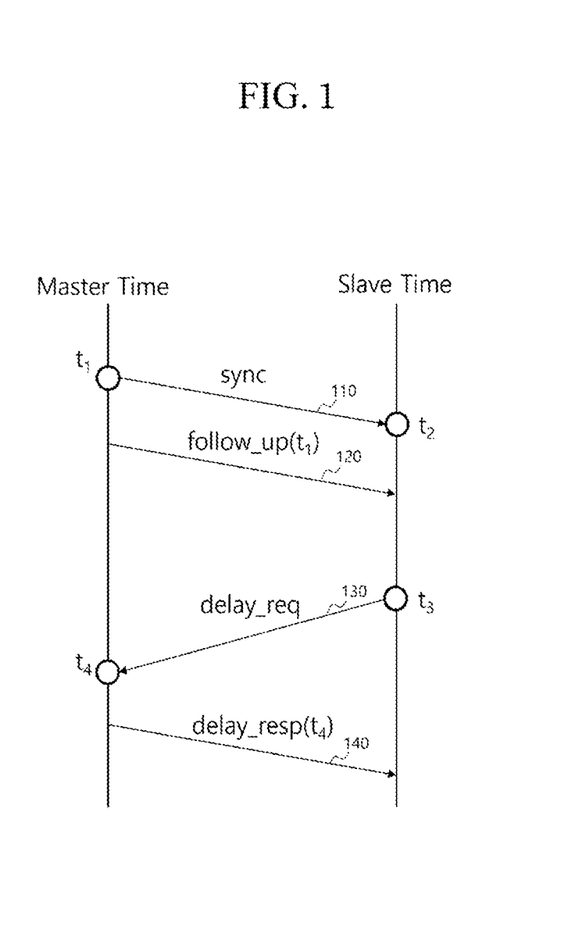
FIG. 1 is a diagram showing a time synchronization method through the transmission and reception of a Precision Time Protocol (PTP) message to aid in understanding of the present invention.

FIG. 1 is a diagram showing a time synchronization method through the transmission and reception of a PTP message to aid in understanding of the present invention.

Referring to FIG. 1, clocks of slave nodes are synchronized with clocks of a master node, and all slave nodes synchronized with the same grand master node set timestamps to the same timer value. The master node's clock (Master Clock) is a clock that provides time to other clocks in the network. The slave node's clock (Slave Clock) is a clock that receives time from other clocks in the network.

The difference in time or clock between nodes is called an offset, and in order to correct the time between nodes, the master node and the slave node perform clock offset and propagation delay correction. This correction is made using the exchange of PTP messages such as sync and follow_up messages.

For example, referring to FIG. 1, a master node transmits a sync message to a slave node (110).

Subsequently, the master node adds a time $t_1$ at which a sync message is transmitted to a subsequent follow_up message and transmits the follow_up message (120).

The slave node records an arrival time $t_2$ of the sync message received from the master node using its own clock (local clock) and compares timestamp values in the successively arriving follow_up message. The slave node calculates the time offset between the master node and the slave node by calculating the difference between the two timestamp values.

However, since the calculated time offset includes propagation delay, a process of calculating inter-node propagation delay is required. delay_req and delay_resp messages are used to calculate the propagation delay.

In order to start calculating the propagation delay, the slave node transmits the delay_req message (130) and records the timestamp $t_3$ of the transmission time at the same time.

Upon receiving the delay_req message, the master node records the timestamp $t_4$ of the arrival time of delay_req and then adds the timestamp $t_4$ to the delay_resp message and responds to the slave node (140).

The slave node calculates the propagation delay using the timestamp $t_4$ included in the delay_resp message and the timestamp $t_3$ of the delay_req message recorded by the slave node. The calculation formula is as follows.

$$\text{Propagation Delay } (pdelay) = ((t_4 - t_3) + (t_2 - t_1))/2$$

$$\text{Offset} = t_2 - t_1 - pdelay$$

Figure 2:
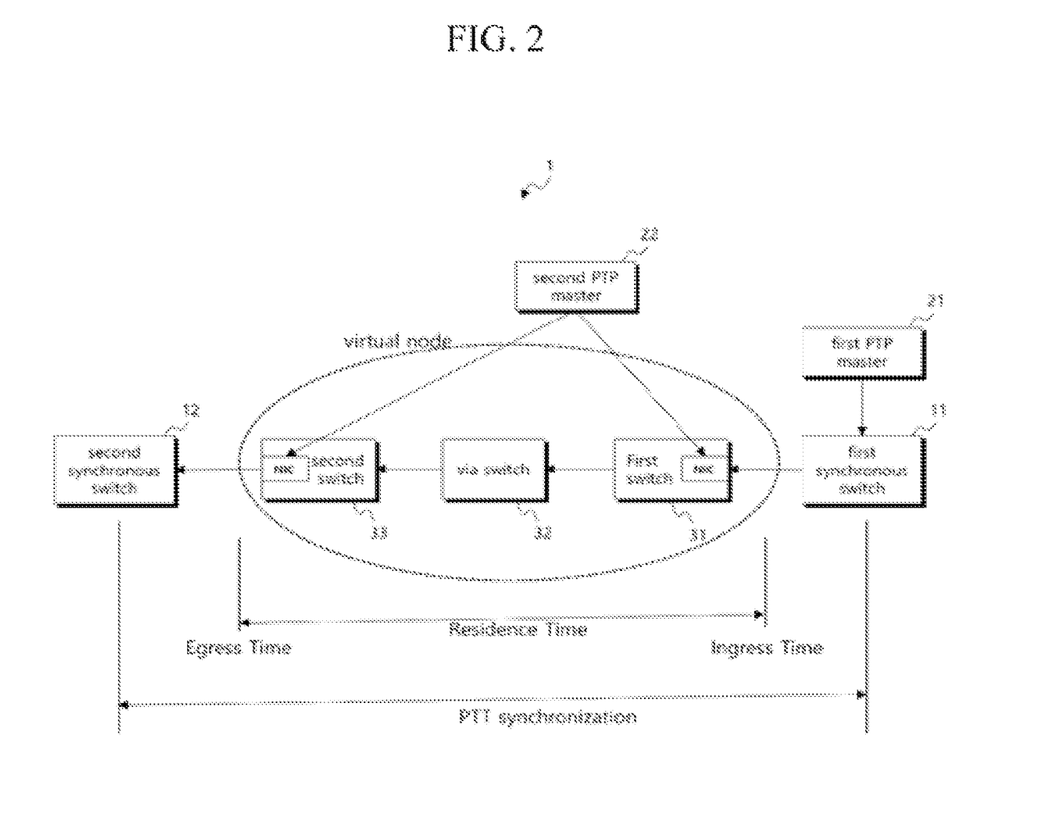
FIG. 2 is a diagram showing the configuration of a PTP synchronous network system according to an embodiment of the present invention.

FIG. 2 is a diagram showing the configuration of a PTP synchronous network system according to an embodiment of the present invention.

In order to perform precise time synchronization between a synchronous switch located remotely and a synchronous switch of an internal network, the present invention proposes a network structure that enables multiple switches therebetween to operate as virtual nodes, and a method thereof.

A PTP synchronous network system 1 according to an embodiment includes a first synchronous switch 11, which is synchronized, a second synchronous switch 12, which is to be synchronized, a first PTP master node 21, a second PTP master node 22, and a virtual node 30. The virtual node 30 includes multiple switches 31, 32, and 33.

The PTP synchronous network system 1 connects the second PTP master node 22 to the first switch 31, which is a device at an ingress point of the virtual node 30, and the second switch 33, which is a device at an egress point of the virtual node 30. Then, the PTP synchronous network system 1 connects the first synchronous switch 11, which is synchronized with the first PTP master node 21, to the first switch 31, which is the device at the ingress point. Also, the PTP synchronous network system 1 connects the second synchronous switch 12, which is to be synchronized with the first PTP master node 21, to the second switch 33, which is the device at the egress point.

The virtual node 30 is composed of a plurality of switches (e.g., 11, 12, and 13) like a 5G core network and may be viewed as a single node. Here, the virtual node 30 operates as a single node on the PTP synchronization protocol.

A PTP synchronization process between the remote first synchronous switch 11 and the second synchronous switch 12 will be described. First, the first synchronous switch 11, which is synchronized with the first PTP master node 21, transmits a time synchronization message.

Subsequently, the first switch 31, which is positioned at the ingress point of the virtual node 30, acquires Ingress_Time using a clock synchronized with the second PTP master node 22. Ingress_Time refers to the arrival time of the time synchronization message that arrives from the first synchronous switch 11 in the same time domain synchronized with the second PTP master node 22. The first switch 31 delivers the time synchronization message to the second switch 33, which is located at the egress point of the virtual node 30, via a via switch 32 through the virtual node 30.

Subsequently, the second switch 33 acquires Egress Time using a clock temporally synchronized with the second PTP master node 22, calculates Residence Time (Egress_Time−Ingress_Time), and then delivers the time synchronization message to the second synchronous switch 12. Egress_time refers to the departure time of the time synchronization message that is delivered to the second synchronous switch 12 in the same time domain synchronized with the second PTP master node 22.

Subsequently, the second synchronous switch 12 at a remote location receives the time synchronization message to acquire a time when the second synchronous switch 12 is synchronized with the first PTP master node 21.

The first switch 31 and the second switch 33, which operate in a conventional manner, individually perform synchronization with the first PTP master node 21 and the second PTP master node 22 through network interface cards (hereinafter referred to as "NIC") and acquire Ingress_Time, which is the arrival time of the PTP message of the first PTP master node 21, on the basis of a time when the synchronization is made with the second PTP master node 22. In a processor environment available to check the time of the second PTP master node 22 at the moment when the PTP message of the first PTP master node 21 arrives, a software process is operating. In this case, structurally, the error rate increases, and thus the time synchronization precision decreases.

The present invention proposes a method of acquiring Ingress_Time of a virtual-node-supported precision PTP NIC based on hardware in order to increase the measurement precision of Ingress_Time and Egress_Time and reduce errors caused by software.

Figure 3:
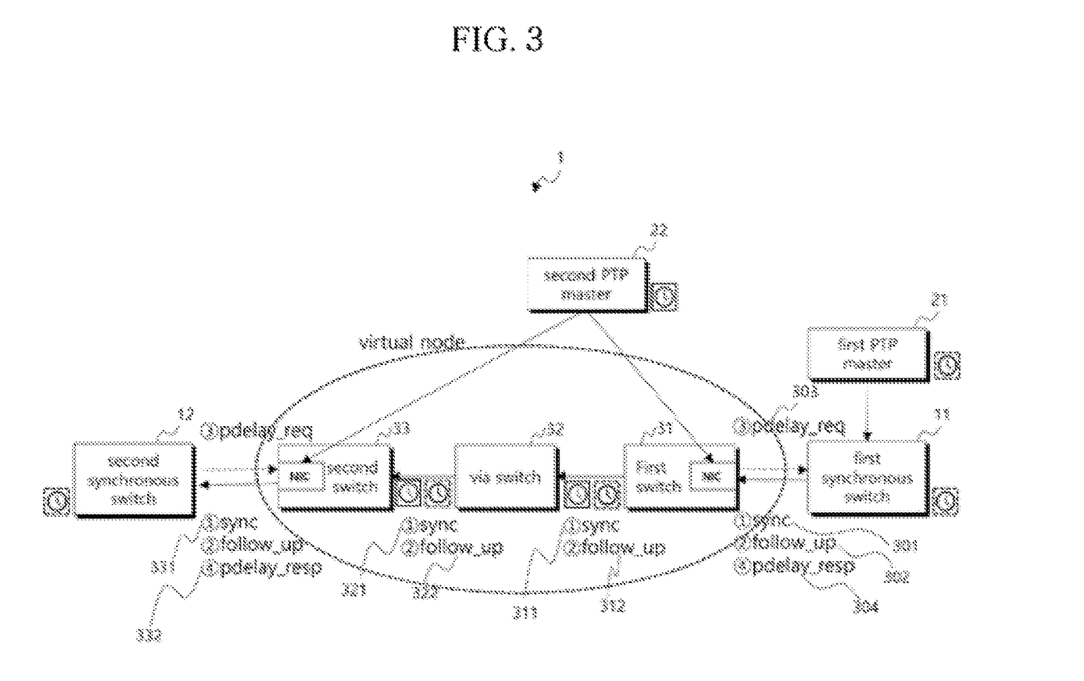
FIG. 3 is a diagram showing the flow of a PTP synchronization method in a PTP synchronization network according to an embodiment of the present invention.

FIG. 3 is a diagram showing the flow of a PTP synchronization method in a PTP synchronization network according to an embodiment of the present invention.

Referring to FIG. 3, the first synchronous switch 11 transmits a sync message to the first switch 31 (301).

When the sync message is received, the NIC of the first switch 31 acquires the arrival time (Ingress_Time) of the sync message using the clock synchronized with the second PTP master node 22.

Subsequently, the first synchronous switch 11 delivers the follow_up message to the first switch 31 (302).

Subsequently, the NIC of the first switch 31 delivers the sync message toward the second synchronous switch 12 through the via switch 32 (311, 321). The NIC of the first switch 31 updates propagation_delay in the correction field of the follow_up message received from the first synchronous switch 11, acquires the arrival time of the sync message using the clock of the second PTP master node 22, adds the arrival time to the suffix field of the follow_up message, and then successively delivers the follow_up message toward the second synchronous switch 12 (312, 322).

The NIC of the first switch 31 may exchange pdelay_req and pdelay_resp messages with the first synchronous switch 11 in order to check the propagation delay (303, 304).

Upon receiving the sync message, the NIC of the second switch 33 delivers the sync message to the second synchronous switch 12 (331). Then, the NIC of the second switch 33 acquires the departure time (Egress_Time) of the sync message, checks the arrival time (Ingress_Time) of the previous sync message in the Suffix field of the successively received follow_up message to acquire Residence_Time (Egress_Time−Ingress_Time) in the virtual node network using a clock synchronized with the second PTP master node 22, reflects Residence_Time (Egress_Time−Ingress_Time) in the correction field of the follow_up message, and then transmits the follow_up message to the second synchronous switch 12 (332).

The second synchronous switch 12 acquires a time when the second synchronous switch 12 is synchronized with the first PTP master node 21 using the received sync message and follow_up message.

Figure 4:
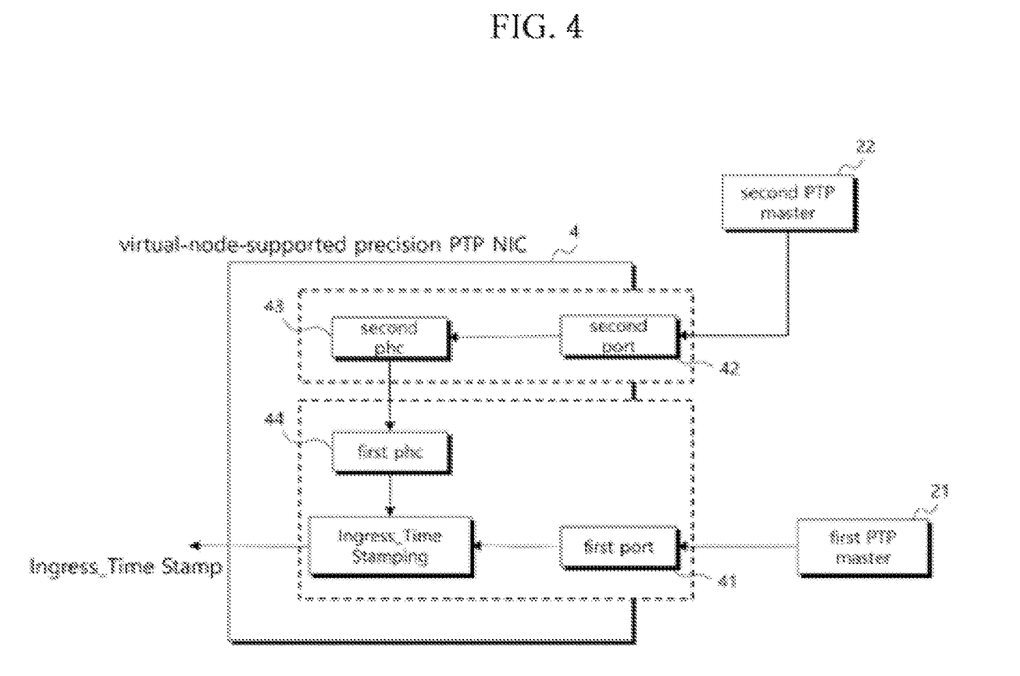
FIG. 4 is a diagram illustrating a network interface card (NIC) structure and an operation method thereof for explaining a process of acquiring an ingress timestamp of a PTP message of a virtual-node-supported precision PTP NIC.

FIG. 4 is a diagram illustrating a network interface card (NIC) structure and an operation method thereof for explaining a process of acquiring an ingress timestamp of a PTP message of a virtual-node-supported precision PTP NIC.

Referring to FIG. 4, a virtual-node-supported precision PTP NIC 4 includes a first port 41, a second port 42, a first phc clock 43, and a second phc clock 44. The virtual-node-supported precision PTP NIC 4 may be the first switch 31 or the second switch 33 of FIGS. 2 and 3.

The first port 41, which is a port for supporting PTP and processing a normal Ethernet frame, provides a general Ethernet port function capable of normally processing a user's packet.

The second port 42 performs only PTP message transmission and reception and physical clock functions, except for general user Ethernet frame processing, in order to acquire precise Ingress_Time by minimizing additional hardware.

The second phc clock 44, which is a processor of the second port 42, is a clock synchronized with the second PTP master node 22.

The first phc clock 43 is synchronized with the second phc clock 44 such that the precise Ingress_Time of the PTP message of the first PTP master node 21 received through the first port 41 is acquired using the clock synchronized with the PTP master node 22. Thus, the virtual-node-supported precision PTP NIC 4 can minimize an additional hardware element and acquire the precise Ingress_Time synchronized with the second PTP master node 22.

According to the network interface card structure and method for precisely acquiring heterogeneous PTP synchronization information for PTP synchronization network extension, it is possible to precisely perform time synchronization with a remote node via different networks in which the time synchronization structure is independently operated.

For example, in order to deliver time synchronization information of an internal network while passing through heterogeneous time synchronization networks, it is necessary to precisely acquire Residence_Time in heterogeneous time synchronization networks while maintaining the time synchronization information of the internal network. For this, a structure capable of simultaneously acquiring timestamps of two different time domains is required, and according to the present invention, by delivering a synchronized clock using a virtual-node-supported precision PTP NIC in nodes located at the entrance and exit of the virtual node, it is possible to measure Ingress_Time and Egress_Time and also accurately measure Residence_Time required to pass through the virtual node.

This structure can precisely measure time in various fields such as distributed network environment, integrated wired/wireless environment, and heterogeneous network connection.

The present invention has been described above with respect to embodiments thereof. Those skilled in the art should understand that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

What is claimed is:

1. A precision time protocol (PTP) synchronization method using a PTP synchronization network system including a virtual node including a first switch at an ingress point and a second switch at an egress point, wherein the first switch and the second switch are time-synchronized with a second PTP master node; a first synchronous switch connected to the first switch, the first synchronous switch being a device synchronized with a first PTP master node; and a second synchronous switch connected to the second switch, the second synchronous switch being a device to be synchronized with the first PTP master node at a remote location, wherein the first switch is lime synchronized with the first PTP master node and the second PIP master node, the second switch is time synchronized with the second PIP master node, the first switch and the second switch between the first synchronous switch and the second synchronous switch operated as the virtual node, the first switch comprises a virtual-node-supported precision PTP network interface card (NIC) comprising a first port, a second port, a first PTP hardware clock (phc), and a second phc, and the first phc is synchronized with the second phc such that Ingress_Time of the PTP message of the first PTP master node received through the first port is acquired using the clock synchronized with the second PTP master node, the second port performs only PTP message transmission and reception and physical clock functions, except for general user Ethernet frame processing, in order to acquire precise Ingress_Time by minimizing additional hardware, the PTP synchronization method comprising operations of:

allowing the first synchronous switch synchronized with the first PTP master node to transmit a PTP message to the first switch;

allowing the first switch to acquire ingress time of the PTP message using a clock synchronized with the second PTP master node and deliver the PTP message to the second switch in the virtual node;

allowing the second switch to acquire egress time of the PTP message using the clock synchronized with the second PTP master node;

allowing the second switch to calculate residence time using the ingress time and the egress time and then transmit the PTP message to the second synchronous switch; and allowing the second synchronous switch to acquire a time when the synchronization is made with the first PTP master node using the received PTP message.

2. The PTP synchronization method of claim 1, wherein the operation of allowing the first switch to acquire ingress time of the PTP message using a clock synchronized with the second PTP master node and deliver the PTP message to the second switch in the virtual node comprises operations of:

allowing the first switch to receive a sync message from the first synchronous switch;

allowing the first switch to acquire an arrival time (Ingress_Time) of the sync message using the clock synchronized with the second PTP master node; and allowing the first switch to deliver the sync message toward the second synchronous switch.

3. The PTP synchronization method of claim 2, wherein the operation of allowing the first switch to acquire ingress time of the PTP message using a clock synchronized with the second PTP master node and deliver the PTP message to the second switch in the virtual node further comprises operations of:

allowing the first switch to receive follow_up message from the first synchronous switch;

allowing the first switch to update propagation_delay in a correction field of the follow_up message received from the first synchronous switch; and allowing the first switch to add an arrival time of the sync message to a suffix field of the follow_up message and then successively deliver the follow_up message toward the second synchronous switch.

4. The PTP synchronization method of claim 1, wherein the operation of allowing the second switch to acquire egress time of the PTP message using the clock synchronized with the second PTP master node comprises operations of:

allowing the second switch to deliver se-a sync message to the second synchronous switch upon receiving the sync message; and allowing the second switch to acquire a departure time (egress_time) of the sync message.

5. The PTP synchronization method of claim 1, wherein the operation of allowing the second switch to calculate residence time using the ingress time and the egress time and then transmit the PTP message to the second synchronous switch comprises operations of:

checking the arrival time (Ingress_Time) of a previous sync message in a Suffix field of the successively received follow_up message;

acquiring Residence_Time (Egress_Time−Ingress_Time) in the virtual node network using a clock synchronized with the second PTP master node; and reflecting Residence_Time (Egress_Time−Ingress_Time) in a correction field of the follow_up message and then transmitting the follow_up message to the second synchronous switch.

6. A precision time protocol (PTP) synchronization network system comprising:

a virtual node including a first switch at an ingress point and a second switch at an egress point, wherein the first switch and the second switch are time-synchronized with a second PTP master node;

a first synchronous switch connected to the first switch, the first synchronous switch being a device synchronized with a first PTP master node; and a second synchronization switch connected to the second switch, the second synchronization switch being a device to be synchronized with the first PTP master node at a remote location, wherein the first switch is time-synchronized with the first PTP master node and the second PTR master node, the second switch is time synchronized with the second PTP master node, the first switch and the second switch between the first synchronous switch and the second synchronous switch operated as the virtual node, the first switch comprises a virtual-node-supported precision PTP network interface card (NIC) comprising a first port, a second port, a first PTP hardware clock (phc), and a second phc, and the first phc is synchronized with the second phc such that Ingress_Time of the PTP message of the first PTP master node received through the first port is acquired using the clock synchronized with the second PTP master node, the second port performs only PTP message transmission and reception and physical clock functions, except for general user Ethernet frame processing, in order to acquire precise Ingress_Time by minimizing additional hardware, the first synchronous switch synchronized with the first PTP master node transmits a PTP message to the first switch, the first switch acquires ingress time of the PTP message using a clock synchronized with the second PTP master node and delivers the PTP message to the second switch in the virtual node, the second switch acquires egress time of the PTP message using the clock synchronized with the second PTP master node, the second switch calculates residence time using the ingress time and the egress time and then transmits the PTP message to the second synchronous switch, and the second synchronous switch acquires a time when the synchronization is made with the first PTP master node using the received PTP message.

* * * * *